(12) United States Patent
Dunn et al.

(10) Patent No.: US 9,317,060 B2
(45) Date of Patent: Apr. 19, 2016

(54) APPARATUS AND METHOD FOR ASSEMBLING LARGE ELECTRONIC DISPLAYS

(71) Applicant: Manufacturing Resources International, Inc., Alpharetta, GA (US)

(72) Inventors: William Dunn, Alpharetta, GA (US); Anthony Taylor, Alpharetta, GA (US)

(73) Assignee: MANUFACTURING RESOURCES INTERNATIONAL, INC., Alpharetta, GA (US)

( * ) Notice: Subject to any disclaimer, the term of this patent is extended or adjusted under 35 U.S.C. 154(b) by 159 days.

(21) Appl. No.: 13/858,426

(22) Filed: Apr. 8, 2013

(65) Prior Publication Data

US 2013/0329363 A1 Dec. 12, 2013

Related U.S. Application Data

(60) Provisional application No. 61/621,068, filed on Apr. 6, 2012.

(51) Int. Cl.
*G06F 1/16* (2006.01)

(52) U.S. Cl.
CPC .......... *G06F 1/1601* (2013.01); *Y10T 29/49002* (2015.01)

(58) Field of Classification Search
CPC ........ G06F 1/601; A47G 1/06; A47G 1/0605; A47G 1/10; A47G 1/065; G09F 1/12
USPC ..................... 361/679.02, 694, 728
See application file for complete search history.

(56) References Cited

U.S. PATENT DOCUMENTS

| 2011/0225859 A1* | 9/2011 | Safavi | 40/448 |
| 2014/0208626 A1* | 7/2014 | Moon | 40/729 |

* cited by examiner

*Primary Examiner* — Cassandra Davis
(74) *Attorney, Agent, or Firm* — Standley Law Group LLP

(57) ABSTRACT

Provided herein is an electronic display assembly for use with a housing as well as a method for assembling an electronic display assembly within a housing. The assembly preferably contains an electronic display module having an electronic display secured within a mounting frame having a top and bottom surface. Top brackets and bottom brackets may be secured to the mounting frame and then secured to the interior of the housing. A front glass assembly can also be secured to the brackets. In some embodiments the housing may contain interior hangers which correspond to hangers that are fastened to the mounting frame of the electronic display module.

20 Claims, 11 Drawing Sheets

APPARATUS AND METHOD FOR ASSEMBLING LARGE ELECTRONIC DISPLAYS

CROSS-REFERENCE TO RELATED APPLICATIONS

This application claims priority to U.S. Application No. 61/621,068 filed on Apr. 6, 2012 and herein incorporated by reference in its entirety.

TECHNICAL FIELD

Embodiments generally relate to an apparatus and method for assembling large electronic displays.

BACKGROUND OF THE ART

Electronic displays are now being used for not only indoor entertainment purposes, but are now being utilized for indoor and outdoor advertising/informational purposes. For example, liquid crystal displays (LCDs), plasma displays, light emitting diode (LED), electroluminescence, light-emitting polymers, organic light emitting diode displays (OLEDs) and many other flat panel displays can now be used to display information and advertising materials to consumers in locations outside of their own home or within airports, arenas, transit stations, stadiums, restaurants/bars, gas station pumps, billboards, and even moving displays on the tops of automobiles or on the sides of trucks.

The rapid development of flat panel displays has allowed users to mount these displays in a variety of locations that were not previously available. Further, the popularity of high definition (HD) television has increased the demand for larger and brighter displays, especially large displays which are capable of producing HD video and visible in sunlight. Further, these displays are also being mounted in places where they might be subject to damage from either the environment or vandalism.

The highly competitive field of consumer advertising has also increased the demand for large, attention-grabbing, bright displays. Displays which can provide these features typically contain a number of advanced electronic assemblies, which over time, can fail or degrade in performance. Once these displays are mounted in the user's desired position, replacing any failed electronic assemblies can be a costly and time-consuming process. Typically, the display must be removed from its mounted position so that it can be serviced. Removing the display can be very expensive and time consuming, especially in highly trafficked and difficult-to-access areas. Further, replacement of certain parts may require a 'clean room' environment.

It is therefore desirable to create an electronic display assembly that can be easily installed, removed, and serviced.

SUMMARY OF THE EXEMPLARY EMBODIMENTS

Exemplary embodiments provide a modular electronic display assembly which can be quickly and easily installed into a housing. A rugged module frame can be used to manipulate the electronic display module during installation. The housing may contain a rear door to allow access to the electronic assemblies for the electronic display. A second rear-facing display may also be placed within the housing.

A front glass assembly may be used to protect the electronic display from damage. Once installed, the front glass assembly may be easily removed, without having to remove the display module or the electronic display itself. However, if the entire display module must be replaced, it can be done in a quick and easy manner similar to the initial installation. The housing may remain as this may be ruggedly secured to the site (i.e. welded, bolted, or encased in concrete).

An exemplary display can be serviced quickly, by minimally-trained personnel while the display remains in its mounted position. The end user may even service the display themselves. Especially in advertising, when displays are inoperable or malfunctioning, valuable advertising revenue can be lost. By reducing the amount of time required to install, remove, or access a display, any interruption of traffic (both human, auto, and rail) may be minimized.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1:
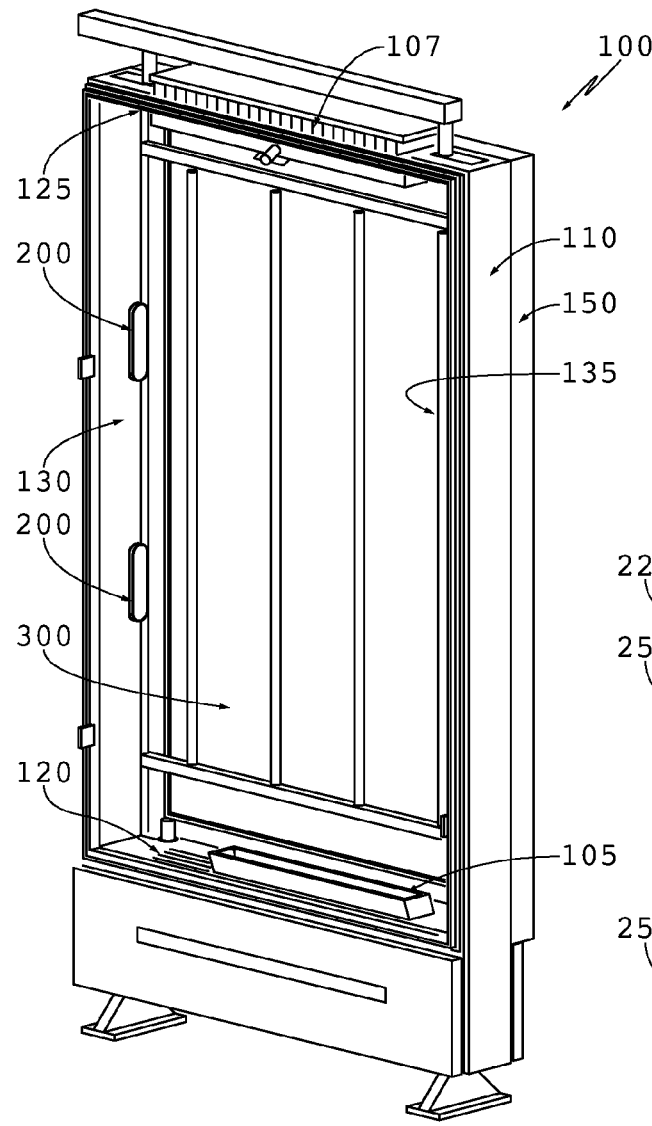
FIG. 1 is a front perspective view of an exemplary housing with a rear door assembly.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a front perspective view of an exemplary housing 100 with a rear door assembly 150. This embodiment preferably contains a frame 110 which defines interior top 125, bottom 120, left side 130, and right side 135 surfaces. The interior right side 135 and left side 130 surfaces preferably contain at least one pair of opposing housing hangers 200. In this particular embodiment, two pairs of housing hangers 200 are used, but this is not required as only a single pair could be used as well as three pair or more. This embodiment of the housing also contains an optional top air exchange 107 and bottom air exchange 105 between the interior of the housing 100 and the exterior ambient air.

In this particular embodiment, a rear facing display 300 is also placed within the housing 100. The rear facing display 300 can be static or dynamic, while in this embodiment the rear facing display 300 is a static backlight graphic. A rear door 150 allows access to the rear facing display 300 and interior of the housing 100 as well as transparent protection for the rear facing display 300. The rear door 150 may be adapted for easy removal/opening to allow this access.

Figure 2:
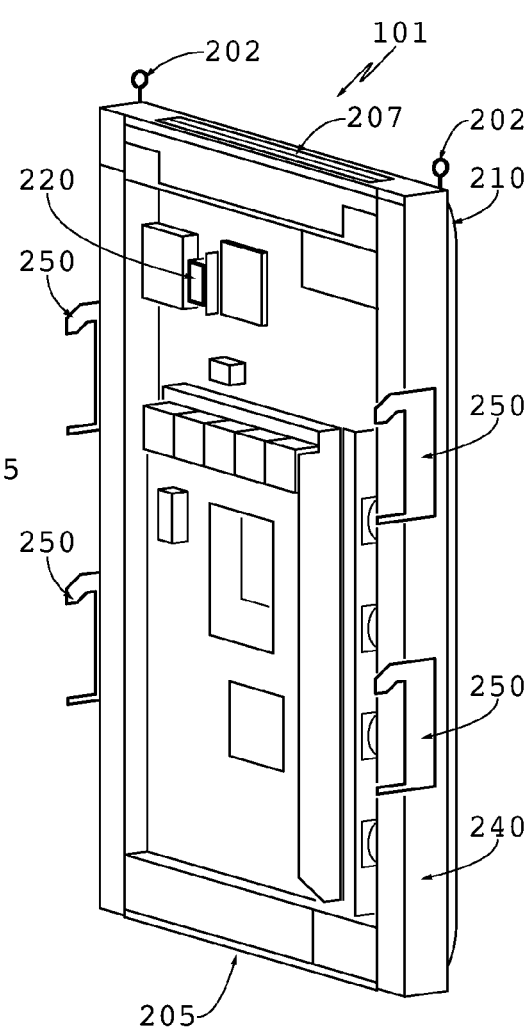
FIG. 2 is a rear perspective view of an exemplary embodiment of a display module having an electronic display contained within a module frame.

FIG. 2 is a rear perspective view of an exemplary embodiment of a display module 101 having an electronic display 210 contained within a module frame 240. Various electrical components 220 can be seen on this rear side of the module 101 for operating the electronic display 210. At least one pair of module hangers 250 are positioned on the module frame 240. While this embodiment uses two pair of hangers 250, this is not required as only a single pair or more than two pairs may be used with other embodiments. At least one lifting point 202 is attached to the module frame 240 in this embodiment. The lifting points 202 may provide the ability to attach a crane or lifting device in order to move the display module 101. The lifting points 202 may be bars, hooks, or any other aperture capable of supporting the weight of the display module 101.

This embodiment of the display module 101 also contains a top air exchange 207 and bottom air exchange 205, which are sized and positioned to substantially align with the top air exchange 107 and bottom air exchange 105 of the housing 100 when the module 101 is inserted.

Figure 3:
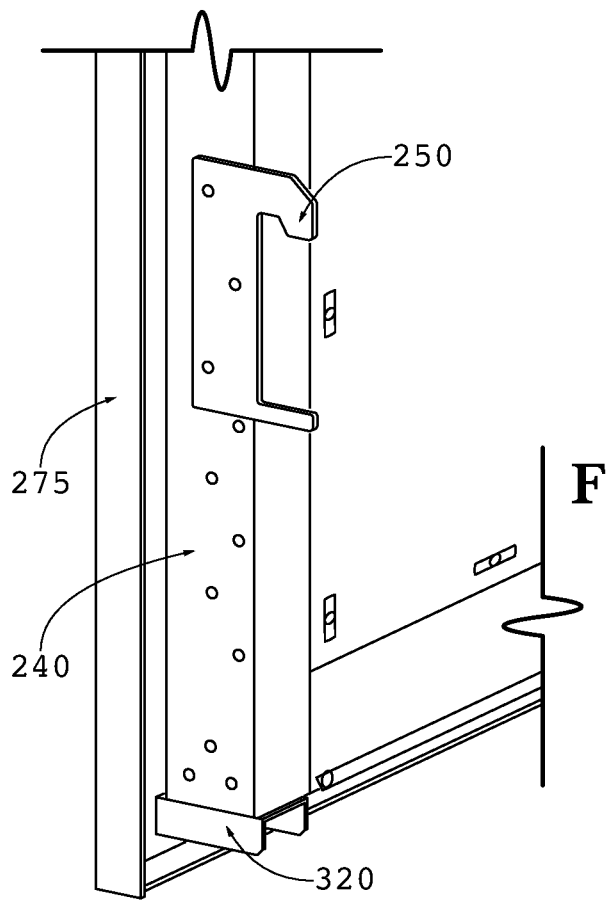
FIG. 3 is a side perspective view of a display module having the front glass assembly.

FIG. 3 is a side perspective view of a display module having the front glass assembly 275, which can be attached to the display module 101 either before or after inserting the module 101 into the housing 100. In this embodiment, the skid bracket 320 is used to attach the module frame 240 to the front glass assembly 275.

Figure 4:
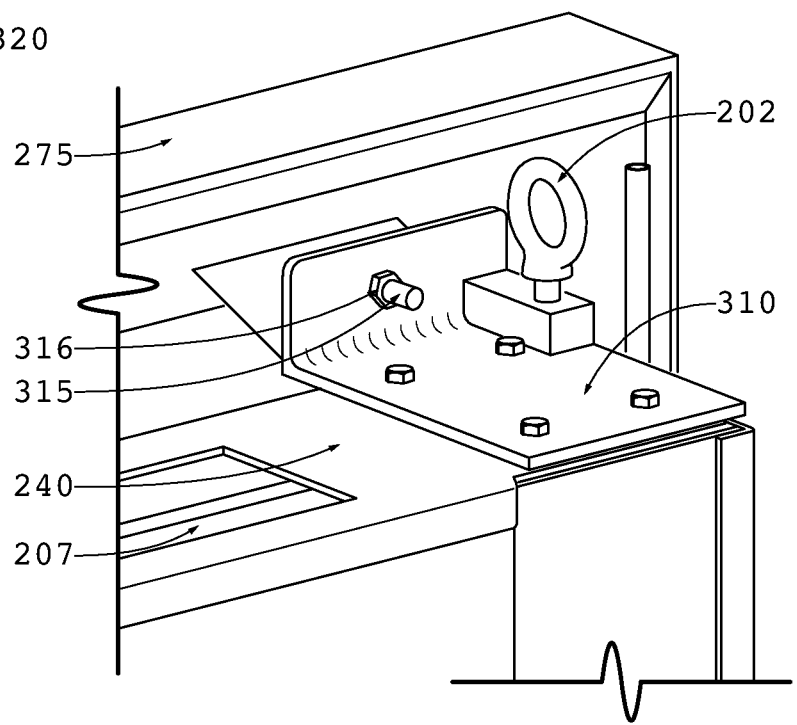
FIG. 4 is a detailed rear perspective view of the attachment between the display module and the front protective glass.

FIG. 4 is a detailed rear perspective view of the attachment between the display module frame 240 and the front glass assembly 275. In this embodiment, an attachment bracket 310 is attached to the module frame 240 and contains an aperture for accepting a threaded post 315 of the front glass assembly 275. A female threaded member 316 may be attached to the threaded post 315 in order to attach the front glass assembly 275 to the display module.

Figures 5, 6:
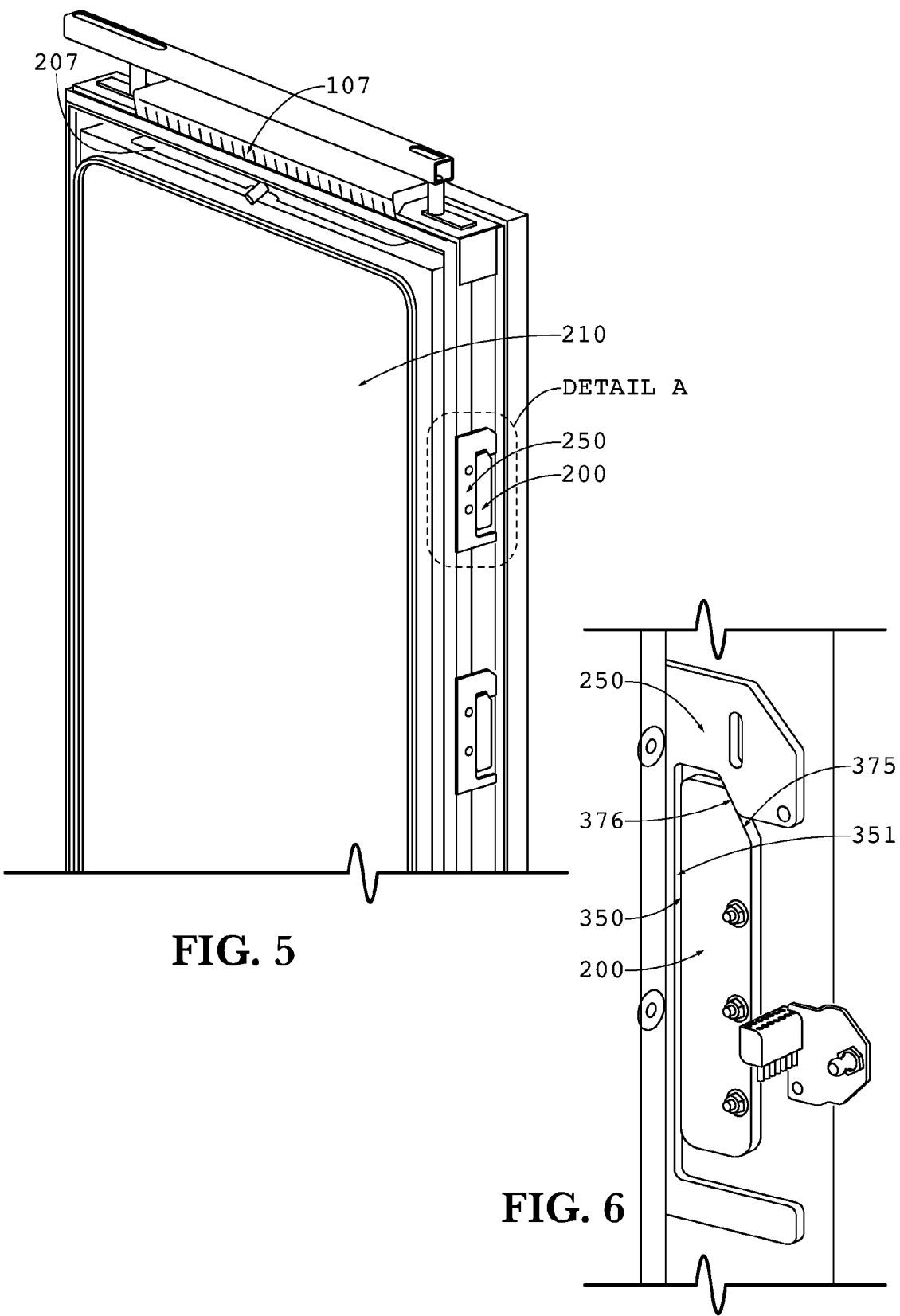
FIG. 5 is a front perspective view of a display module once inserted into the housing, where portions of the housing have been hidden to illustrate the interactions between hangers.
FIG. 6 is a perspective view of Detail A shown in FIG. 5.

FIG. 5 is a front perspective view of a display module once inserted into the housing, where portions of the housing have been hidden to illustrate the interactions between hangers 200 and 250.

FIG. 6 is a perspective view of Detail A shown in FIG. 5. The housing hanger 200 preferably contains a substantially vertical surface 350 and a slanted surface 375. The module hanger 250 preferably contains a substantially vertical surface 351 and a slanted surface 376. As the display module is inserted into the housing, the vertical surface 351 moves forward into the housing until it contacts the vertical surface 350 of the housing hanger 200. At this point, the display module is lowered slowly until the slanted surface 376 of the module hanger 250 contacts the slanted surface 375 of the housing hanger 200.

Figures 7, 8:
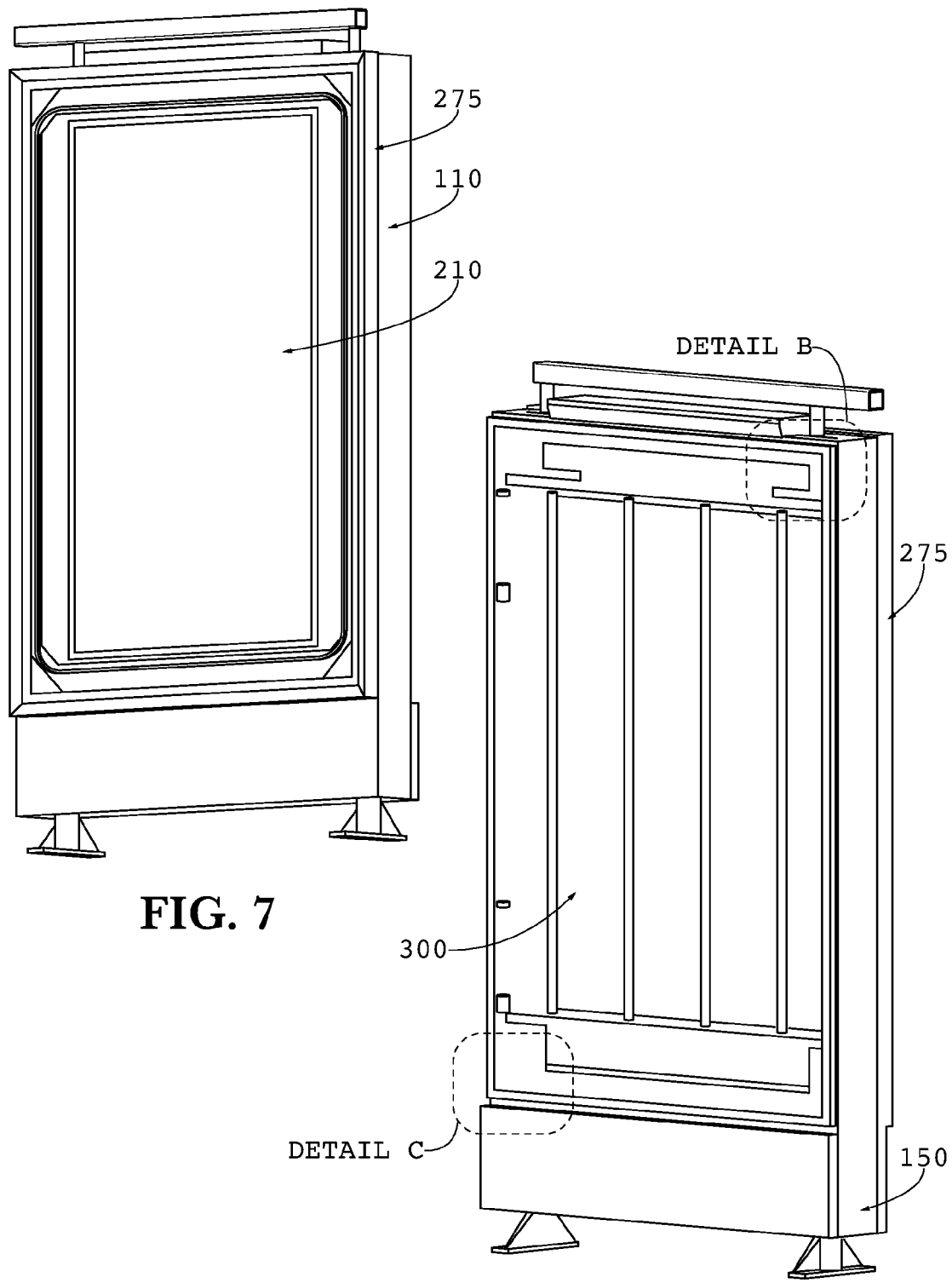
FIG. 7 is a front perspective view of a display module once inserted into the housing.
FIG. 8 is a rear perspective view of a display module once inserted into the housing where the rear door assembly has been opened/removed.

FIG. 7 is a front perspective view of a display module once inserted into the housing. Here, the frame 110 of the housing has been replaced to show the final assembly. The electronic display 210 faces forward and is positioned behind the front glass assembly 275.

FIG. 8 is a rear perspective view of a display module once inserted into the housing where the rear door assembly 150 has been opened/removed. Here the front portion of the rear facing display 300 may be observed. In this embodiment, a CCFL backlit graphic is used as the rear facing display 300. As discussed above, this can be any other type of backlight (esp. LED) or electronic display. In this exemplary embodiment, Details B and C illustrate where a user can access the attachment means for the front glass assembly 275 in order to remove the front glass assembly 275 without having to remove the rear facing display 300 or the display module 101 or electronic display 210.

Figure 9:
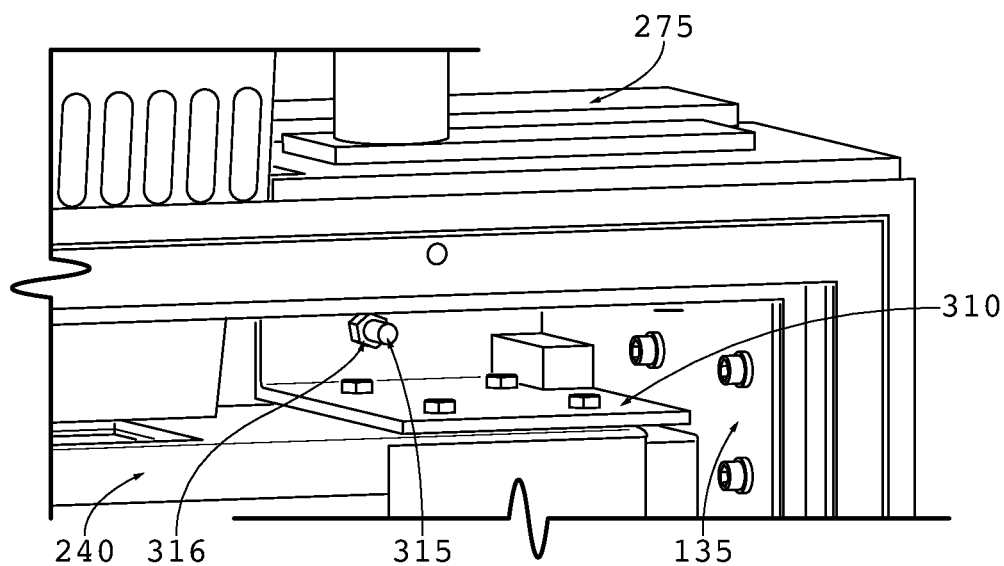
FIG. 9 is a perspective view of Detail B shown in FIG. 8.

FIG. 9 is a perspective view of Detail B shown in FIG. 8. This view shows the attachment bracket 310 and the aperture for accepting a threaded post 315 from the front glass assembly 275. In order for the user to detach the top portion of the front glass assembly 275, all that would be required is to remove the female threaded member 316 attached to the threaded post 315.

Figure 10:
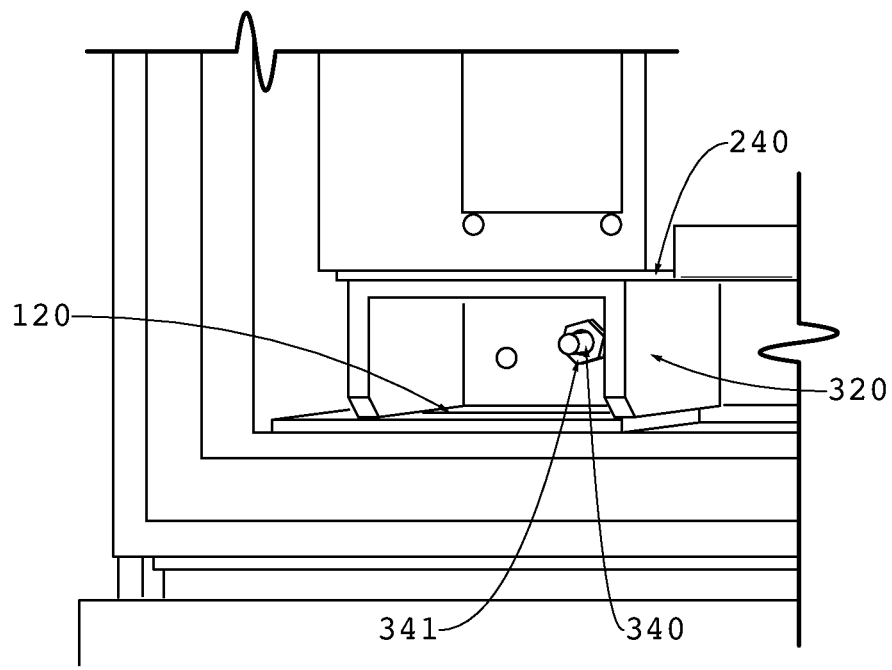
FIG. 10 is a perspective view of Detail C shown in FIG. 8.

FIG. 10 is a perspective view of Detail C shown in FIG. 8. Here, the skid bracket 320 is attached to the module frame 240 and contains an aperture for accepting a threaded post 340 from the front glass assembly 275. Again, a female threaded member 341 may be attached to the threaded post 340 in order to secure the front glass assembly 275 to the display module. As the display module is inserted into the housing, the skid bracket 320 may slide along the bottom interior surface 120 of the housing. This is not required however, as the module may be inserted so that the hangers 200/250 engage without sliding the skid bracket 320 along the surface 120. Once the hangers 200/250 are engaged, in some embodiments the skid bracket 320 may support at least some of the weight of the display module. Alternatively, in other embodiments the entire weight of the display module may be supported by the hangers 200/250.

As illustrated in these figures, the display module 110 can be completely preassembled and attached to the housing 100 in a very quick and easy process. Once installed, the rear portion of the electronic display 210 and the various electronic components 220 can be easily accessed for service/replacement. Also once installed, the front glass assembly 275 can be easily removed by removing/opening the rear door 150 and removing the female threaded members 316 and 341. A replacement front glass assembly can then be installed in reverse fashion.

Figure 11:
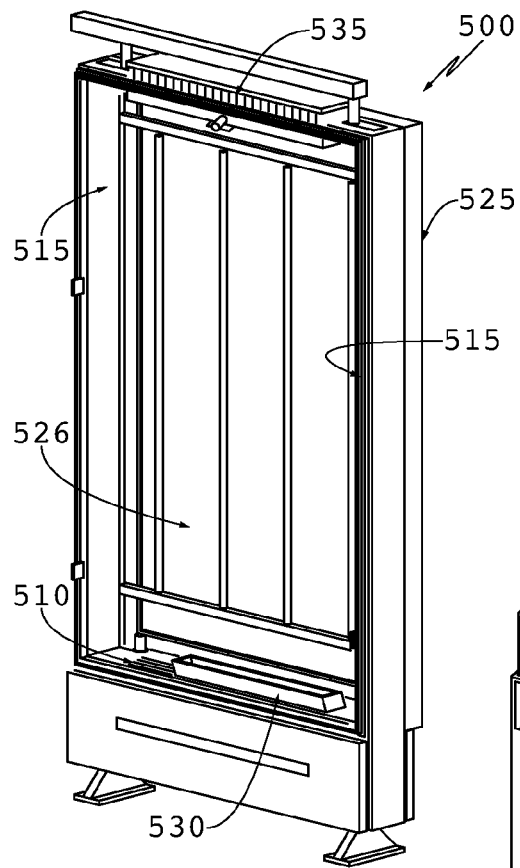
FIG. 11 is a front perspective view of another embodiment of the housing with a rear door assembly.

FIG. 11 is a front perspective view of another embodiment of a housing 500 with a rear door assembly 525. In this embodiment, there are no hangers attached to the interior side surfaces 515 of the housing 500. This embodiment does show the optional top air exchange 535 and bottom air exchange 530. Another rear facing display 526, similar to those described above may also be used here.

Figure 12:
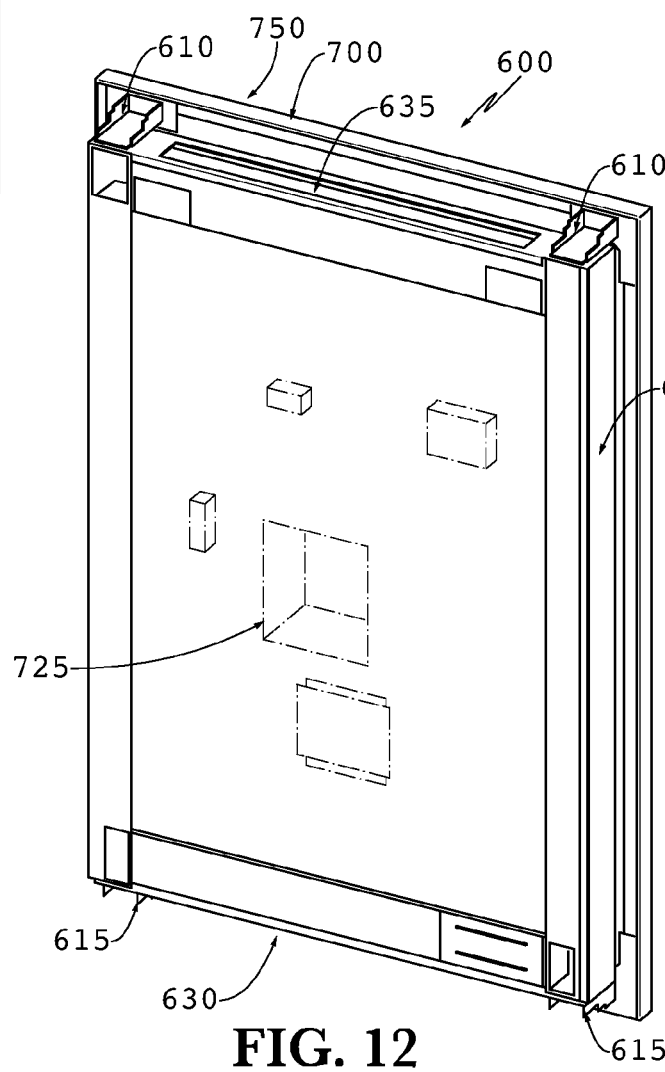
FIG. 12 is a rear perspective view of another embodiment of a display module having an electronic display contained within a module frame and a front glass assembly.

FIG. 12 is a rear perspective view of another embodiment of a display module 600 having an electronic display 750 contained within a module frame 650 and a front glass assembly 700. From the rear perspective, the electronic components 725 for operating the electronic display 750 may be observed. This embodiment of the module 600 also contains the top air exchange 635 and bottom air exchange 630 which, when the module 600 is inserted into the housing 500, should substantially align with the top air exchange 535 and bottom air exchange 530 of the housing 500 respectively. In this embodiment, top attachment brackets 610 and bottom attachment brackets 615 are used to fasten the front glass assembly 700 to the module frame 650.

Figure 13:
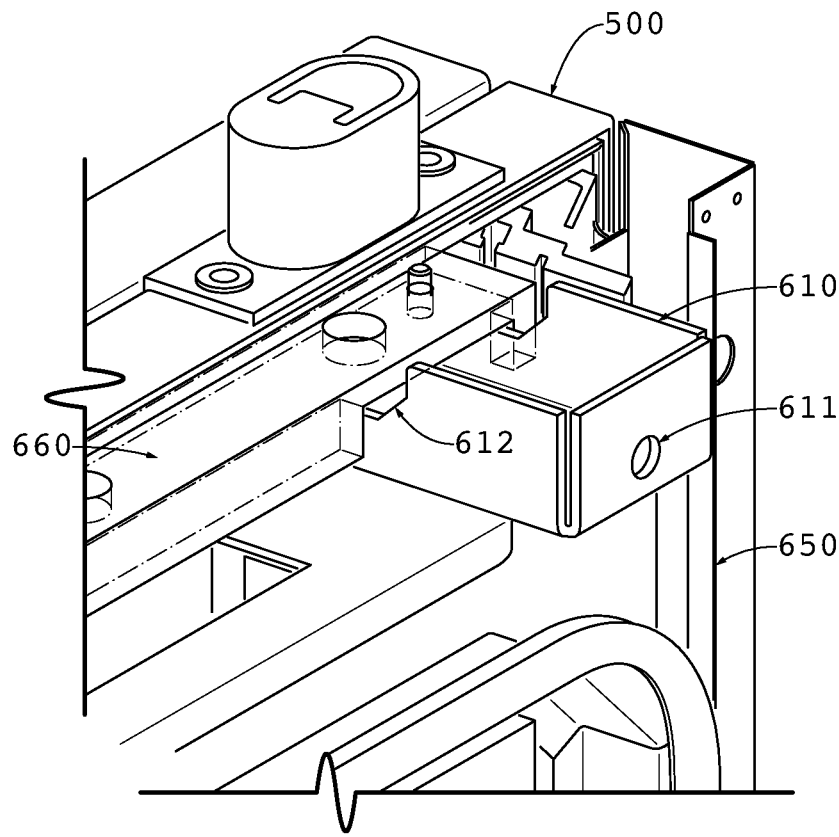
FIG. 13 is a detailed front perspective view of a display module inserted into a housing and showing the top assembly bracket, where the front glass assembly has been removed.

FIG. 13 is a detailed front perspective view of a display module inserted into a housing 500 and showing the top assembly bracket 610, where the front glass assembly 700 has been removed. A portion of the module frame 650 and housing 500 has also been removed to show the interaction between the retaining rail 660 and the top assembly bracket 610. The top assembly bracket 610 preferably contains an aperture 611 for accepting a threaded post from the front glass assembly 700. As the module is inserted into the housing, the top assembly bracket 610 preferably moves inward until the ledge 612 on the bracket contacts a retaining rail 660.

Figure 14:
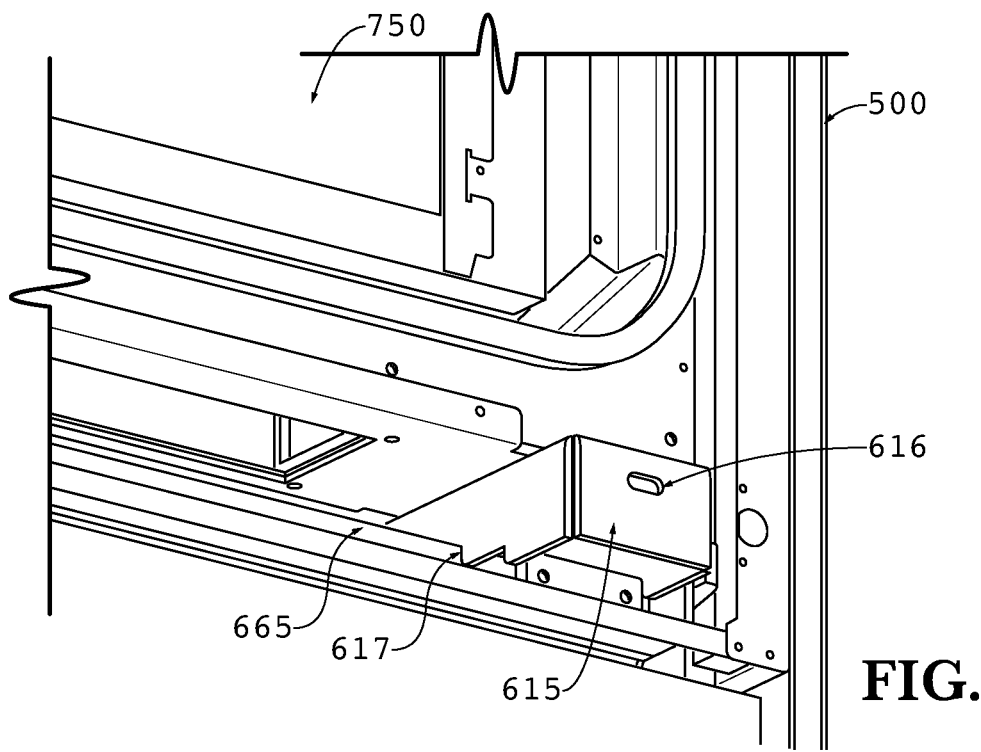
FIG. 14 is a detailed front perspective view of a display module inserted into a housing and showing the bottom assembly bracket, where the front glass assembly has been removed.

FIG. 14 is a detailed front perspective view of a display module inserted into a housing 500 and showing the bottom assembly bracket 615, where the front glass assembly 700 has been removed. A portion of the module frame 650 and housing 500 has also been removed to show the interaction between the retaining rail 665 and the bottom assembly bracket 615. The assembly bracket 615 preferably contains an aperture 616 for accepting a threaded post from the front glass assembly 700. As the module is inserted into the housing, the bottom assembly bracket 615 preferably moves inward until the ledge 617 on the bracket contacts a retaining rail 665.

Figure 15:
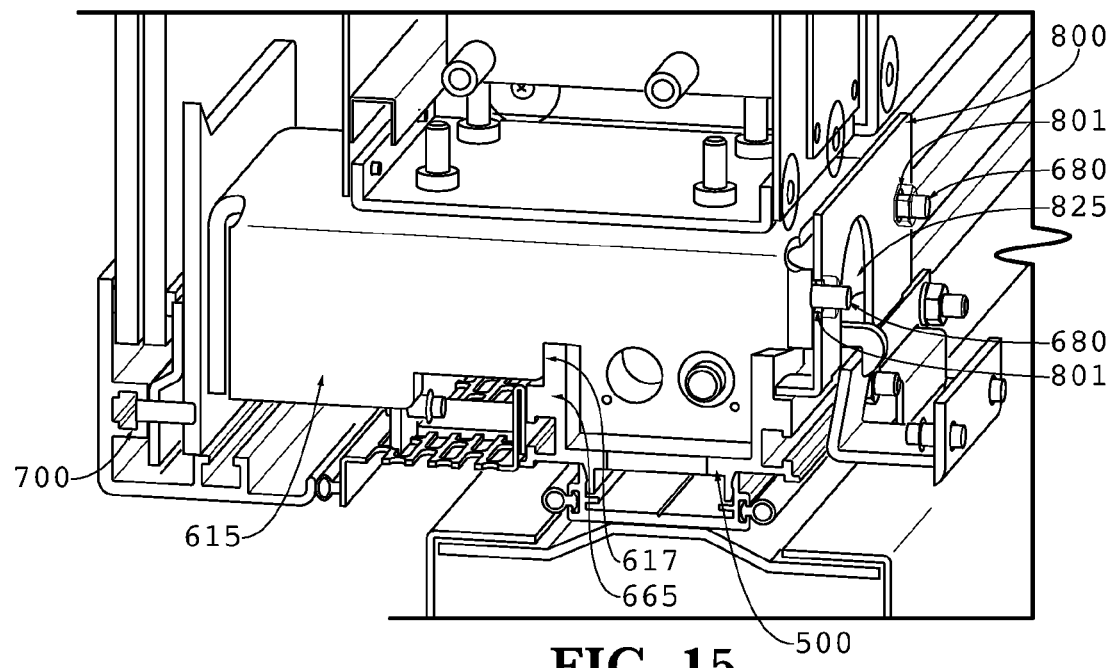
FIG. 15 is a detailed sectional view of the bottom assembly bracket, bottom rail, and retaining plate.

FIG. 15 is a detailed sectional view of the bottom assembly bracket 615, bottom rail 665, and retaining plate 800 which is preferably attached to the housing 500. One or more threaded posts 680 may extend from the bottom assembly bracket 615 and pass through apertures 801 on the retaining plate 800. Female threaded members may attach to the threaded posts 680 to secure the ledge 617 of the bottom assembly bracket 615 against the rail 665.

Figure 16:
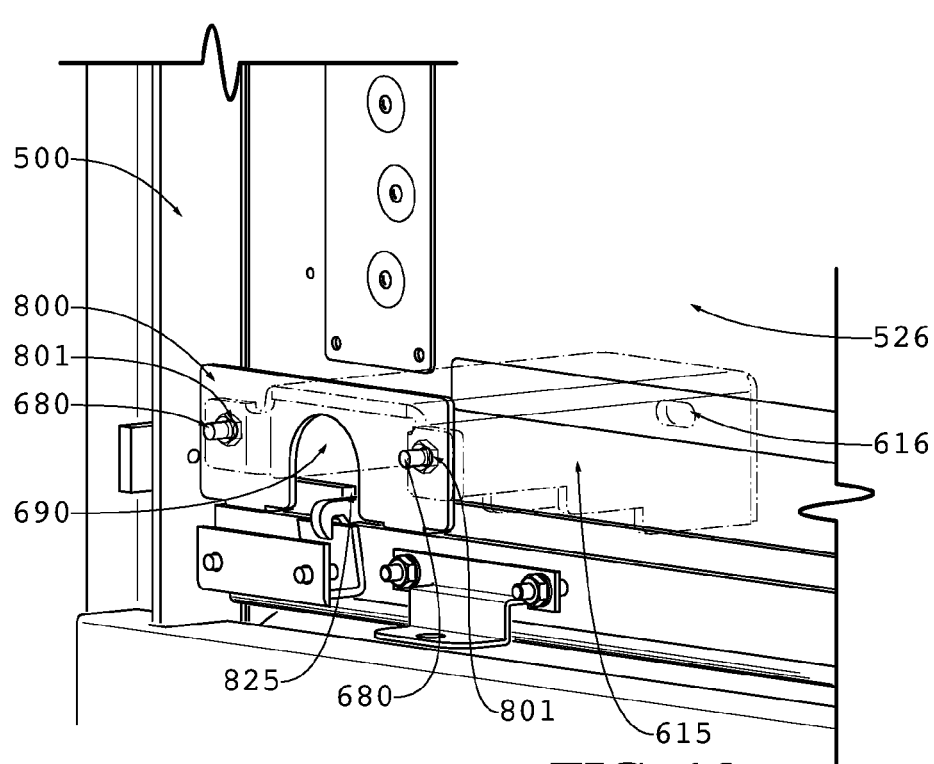
FIG. 16 is a rear perspective view of the bottom assembly bracket and retaining plate.

FIG. 16 is a rear perspective view of the bottom assembly bracket 615 and retaining plate 800. The bottom assembly bracket 615 preferably contains a cavity 690 which is substantially aligned with a cutout 825 in the retaining plate 800 which allows access to the aperture 616 of the bottom assembly bracket 615.

Figure 17:
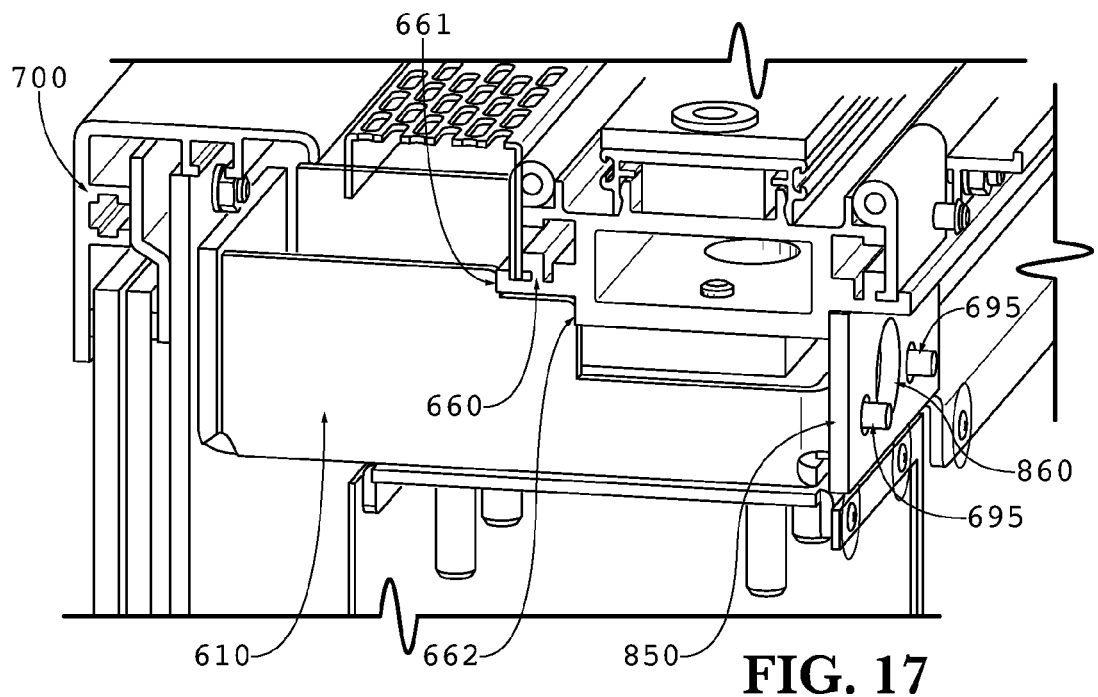
FIG. 17 is a detailed sectional view of the top assembly bracket, top rail, and retaining plate.

FIG. 17 is a detailed sectional view of the top assembly bracket 610, top rail 660, and retaining plate 850 which is preferably attached to the housing 500. One or more threaded posts 695 may extend from the top assembly bracket 610 and pass through apertures 851 on the retaining plate 850. Female threaded members may attach to the threaded posts 695 to secure the ledge 661 of the top assembly bracket 610 against the rail 660. In this embodiment, an optional second ledge 662 in the top assembly bracket 610 is provided to further secure the bracket 610 against the rail 660.

Figure 18:
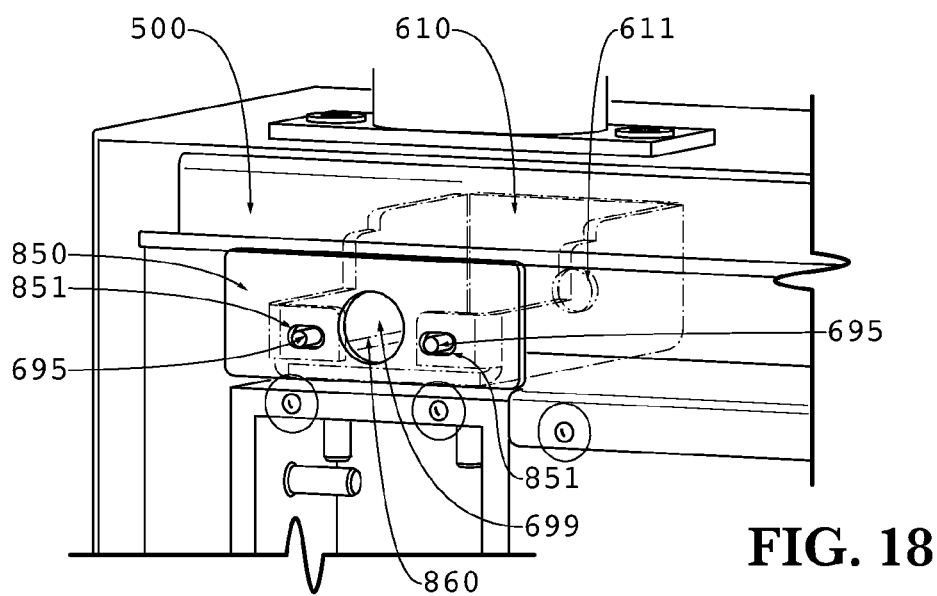
FIG. 18 is a rear perspective view of the top assembly bracket and retaining plate.

FIG. 18 is a rear perspective view of the top assembly bracket 610 and retaining plate 850. The top assembly bracket 610 preferably contains a cavity 699 which is substantially aligned with a cutout 860 in the retaining plate 850 which allows access to the aperture 611 of the top assembly bracket 610.

Figure 19:
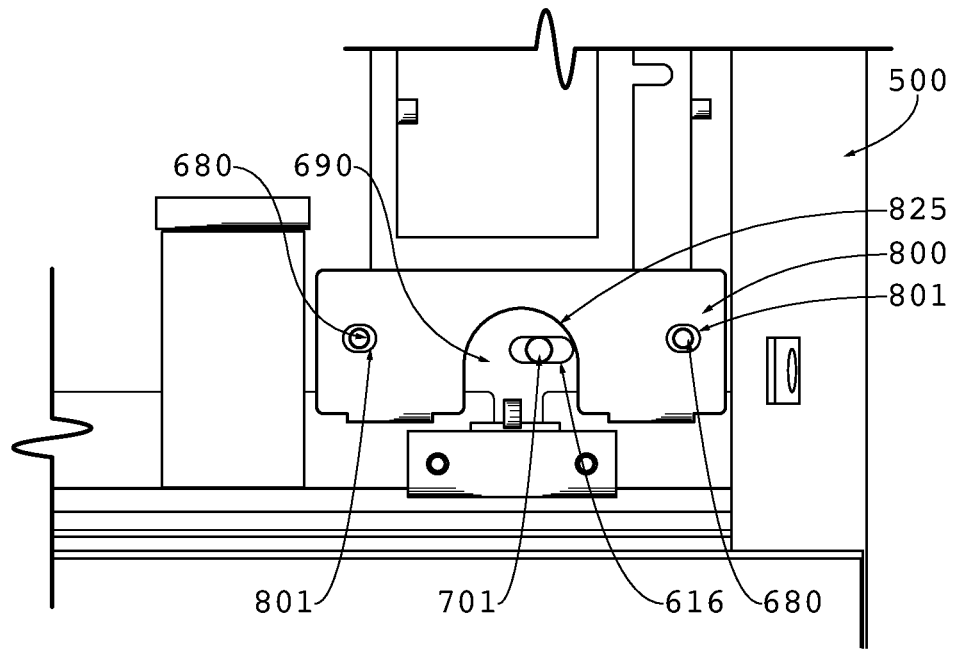
FIG. 19 is a rear planar view of the bottom retaining plate, bottom assembly bracket, and threaded post of the front glass assembly.

FIG. 19 is a rear planar view of the bottom retaining plate 800, bottom assembly bracket 615, and threaded post 701 of the front glass assembly 700. As described above, the bottom assembly bracket 615 preferably contains a cavity 690 which is substantially aligned with a cutout 825 in the retaining plate 800 which allows access to the threaded post 701 of the front glass assembly 700. In this embodiment, a user can access the female threaded fastener on the threaded post 701 through the bottom assembly bracket 615 so that the front glass assembly 700 can be easily removed and replaced without having to remove the entire module or the electronic display.

Figure 20:
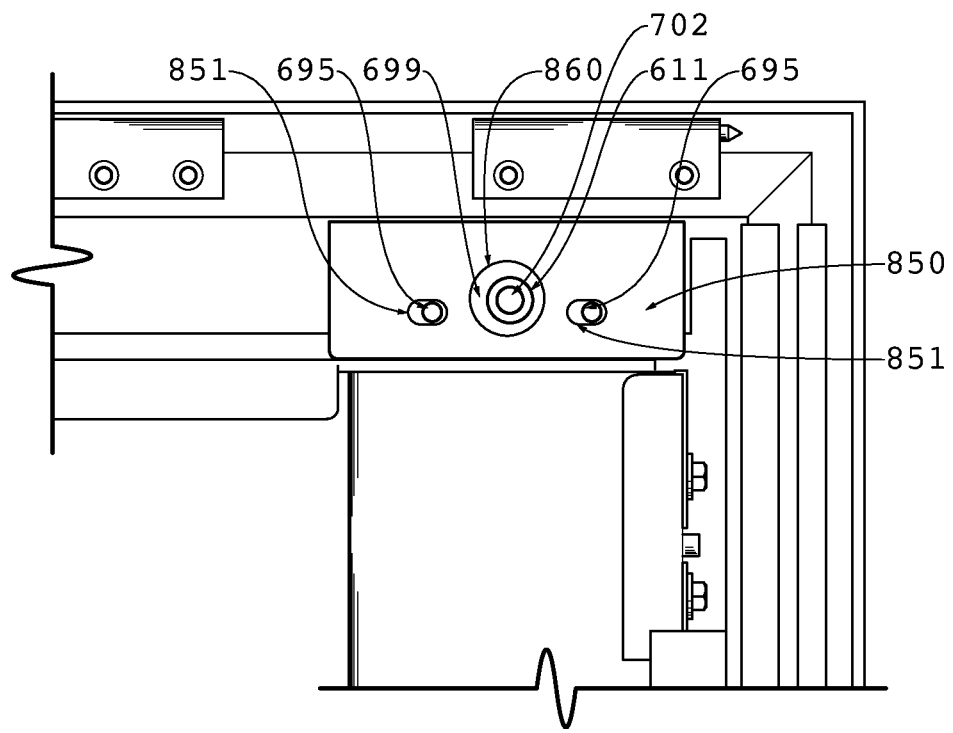
FIG. 20 is a rear planar view of the top retaining plate, top assembly bracket, and threaded post of the front glass assembly.

FIG. 20 is a rear planar view of the top retaining plate 850, top assembly bracket 610, and threaded post 702 of the front glass assembly 700. As discussed above, the top assembly bracket 610 preferably contains a cavity 699 which is substantially aligned with a cutout 860 in the retaining plate 850 which allows access to the threaded post 702 of the front glass assembly 700. In this embodiment, a user can access the female threaded fastener on the threaded post 702 through the top assembly bracket 610 so that the front glass assembly 700 can be easily removed and replaced without having to remove the entire module or the electronic display.

Figure 21:
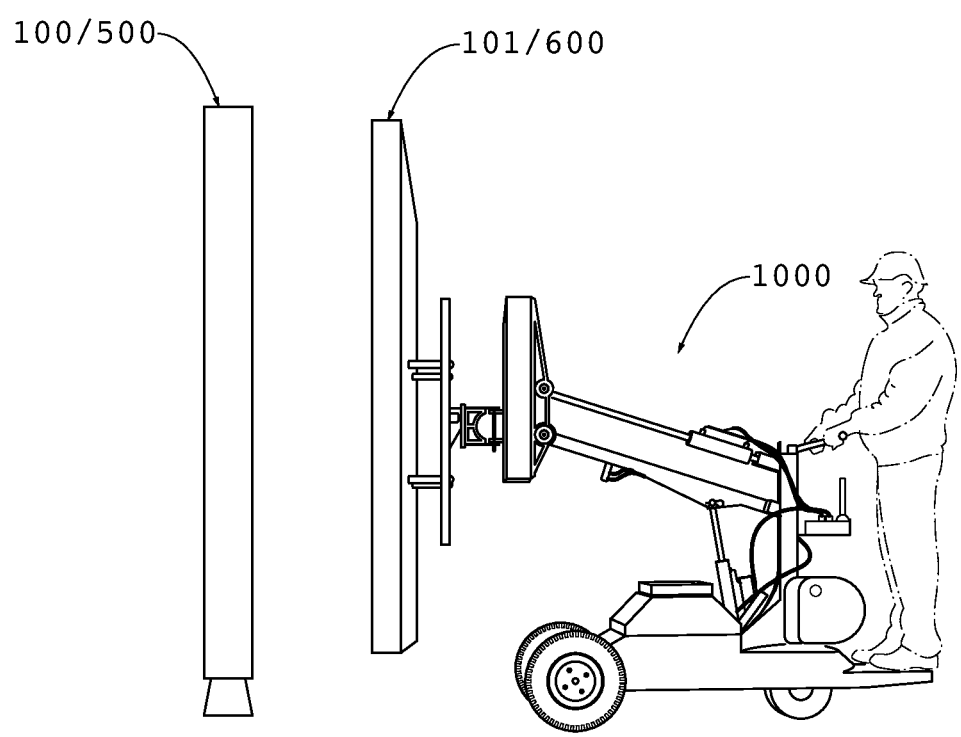
FIG. 21 is an illustration of an exemplary method for inserting the display module into the housing.

FIG. 21 is an illustration of an exemplary method for inserting the display module 101/600 into the housing 100/500. A suction device 1000 may be used to apply a suction force to the front glass assembly of the display module 101/600 so that it may be lifted and maneuvered around. Once lifted, the display module 101/600 may be oriented parallel to the housing and moved horizontally into the housing. If using the housing 100, the display module 101 may be moved horizontally until the vertical surface 351 contacts the vertical surface 350 of the housing hanger 200. At this point, the display module is lowered slowly until the slanted surface 376 of the module hanger 250 contacts the slanted surface 375 of the housing hanger 200. If using the housing 500, the display module 600 may be moved horizontally until the posts 680/695 pass through the apertures 801/851. At this point female threaded members may be attached to the posts 680/695 and tightened until the attachment brackets 610/615 are snug against the rails 660/665.

An exemplary suction device 1000 would be a GlasLift® 351 available from Intellitech of Denmark. www.hh-intellitech.dk Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. An electronic display assembly for use with a housing having interior top, bottom, left side, and right side portions as well as a front and back side, the assembly comprising:
    an electronic display module comprising an electronic display secured within a mounting frame, said mounting frame having a top surface and a bottom surface and sized to fit within the interior top, bottom, left side, and right side portions of the housing;
    a top pair of brackets attached to the top surface of the mounting frame, each bracket containing an aperture;
    a bottom pair of brackets attached to the bottom surface of the mounting frame, each bracket containing an aperture;
    a front glass assembly having a top pair of threaded posts positioned to pass through the apertures in the top brackets and a bottom pair of threaded posts positioned to pass through the apertures in the bottom brackets; and
    a female threaded member attached to each of the threaded posts, securing the front glass assembly to the mounting frame.

2. The electronic display assembly of claim 1 further comprising:
    a left housing hanger adapted for placement on the interior left side portion of the housing;
    a right housing hanger adapted for placement on the interior right side portion of the housing;
    a left frame hanger on a left side of the mounting frame which is sized to accept the left housing hanger; and
    a right frame hanger on a right side of the mounting frame which is sized to accept the right housing hanger.

3. The electronic display assembly of claim 2 further comprising:
    a substantially vertical surface on the left housing hanger which contacts a substantially vertical surface on the left frame hanger once the electronic display module is mounted within the housing; and
    a substantially vertical surface on the right housing hanger which contacts a substantially vertical surface on the right frame hanger once the electronic display module is mounted within the housing.

4. The electronic display assembly of claim 2 further comprising:
    a slanted surface on the left housing hanger which contacts a slanted surface on the left frame hanger once the electronic display module is mounted within the housing; and
    a slanted surface on the right housing hanger which contacts a slanted surface on the right frame hanger once the electronic display module is mounted within the housing.

5. The electronic display assembly of claim 1 further comprising:
    a top air exchange on the electronic display module which aligns with a top air exchange on the housing when the module is inserted into the housing; and
    a bottom air exchange on the electronic display module which aligns with a bottom air exchange on the housing when the module is inserted into the housing.

6. The electronic display assembly of claim 1 wherein:
    the female threaded members are accessible from a rear side of the housing.

7. The electronic display assembly of claim 1 further comprising:
    an additional threaded post which extends from the mounting frame and passes through apertures placed on retaining plates within the housing; and
    a female threaded member attached to said additional threaded post, securing the electronic display module within the housing.

8. The electronic display assembly of claim 7 further comprising:
    a cutout within each retaining plate that allows access to the top pair of threaded posts and the bottom pair of threaded posts of the front glass assembly.

9. The electronic display assembly of claim 1 further comprising:
    a ledge on each of the bottom brackets which contacts a bottom retaining rail mountable within the bottom portion of the housing when the electronic display module is inserted into the housing; and
    a ledge on each of the top brackets which contacts a top retaining rail mountable within the top portion of the housing when the electronic display module is inserted into the housing.

10. The electronic display assembly of claim 1 further comprising:
    a rear display adapted for attachment to the back side of the housing and facing opposite the electronic display.

11. The electronic display assembly of claim 10 wherein:
    the rear display is a backlit static graphic.

12. A method for assembling an electronic display assembly within a housing having interior top, bottom, left side, and right side portions as well as a front and back side; the electronic display assembly having an electronic display module comprising an electronic display secured within a mounting frame, said mounting frame having a top surface and a bottom surface; a front glass assembly attached to the mounting frame; a top pair of brackets attached to the top surface of the mounting frame; a bottom pair of brackets attached to the bottom surface of the mounting frame; a pair of top retaining plates attached to the interior top portion of the housing and an aperture within each of the top retaining plates; a pair of bottom retaining plates attached to the interior bottom portion of the housing and an aperture within each of the bottom retaining plates; a threaded post which corresponds to each aperture, extending from each of the brackets, the method comprising the steps of:

applying suction to the front glass assembly;
lifting the electronic display assembly;
aligning the threaded posts of each bracket with corresponding apertures in the top and bottom retaining brackets;
inserting the electronic display assembly into the housing until the top brackets contact the top retaining plates and the bottom brackets contact the bottom retaining plates; and
attaching a female threaded member onto each of the threaded posts.

13. The assembly method of claim 12 wherein:
the electronic display assembly is inserted into the housing through the front side of the housing, and
the female threaded members are attached to the threaded posts through the back side of the housing.

14. An electronic display assembly, the assembly comprising:
a housing having an interior top portion, interior bottom portion, front side, and back side;
an electronic display module comprising an electronic display secured within a mounting frame, said mounting frame having a top surface and a bottom surface and sized to fit within the interior top portion and interior bottom portion of the housing;
a top pair of brackets attached to the top surface of the mounting frame, each bracket containing a threaded post extending towards the back side of the housing;
a bottom pair of brackets attached to the bottom surface of the mounting frame, each bracket containing a threaded post extending towards the back side of the housing;
a pair of top retaining plates attached to the interior top portion of the housing;
an aperture within each of the top retaining plates sized and positioned to accept the threaded post from the top bracket;
a pair of bottom retaining plates attached to the interior bottom portion of the housing;
an aperture within each of the bottom retaining plates sized and positioned to accept the threaded post from the bottom bracket; and
a female threaded member attached to each of the threaded posts, securing the electronic display module within the housing.

15. The electronic display assembly of claim 14 further comprising:
a front glass assembly attached to the top and bottom brackets.

16. The electronic display assembly of claim 14 further comprising:
an aperture in each of the top and bottom brackets;
a front glass assembly having additional threaded posts, where each additional threaded post is positioned to pass through each of the apertures in the top and bottom brackets; and
an additional female threaded member attached to each of the additional threaded posts, securing the front glass assembly to the mounting frame.

17. The electronic display assembly of claim 15 wherein:
the front glass assembly is attached to the brackets with a threaded fastener that is accessible from the back side of the housing.

18. The electronic display assembly of claim 16 further comprising:
a cutout within each retaining plate that allows access to the threaded posts which extend from the top brackets and the threaded posts which extend from the bottom brackets.

19. The electronic display assembly of claim 14 further comprising:
a bottom retaining rail positioned along the interior bottom portion of the housing;
a top retaining rail positioned along the interior top portion of the housing;
a ledge on each of the bottom brackets which contacts the bottom retaining rail when the electronic display module is inserted into the housing; and
a ledge on each of the top brackets which contacts the top retaining rail when the electronic display module is inserted into the housing.

20. The electronic display assembly of claim 14 wherein:
the electronic display is a liquid crystal display.

* * * * *